US012413353B2

(12) United States Patent
Sun et al.

(10) Patent No.: US 12,413,353 B2
(45) Date of Patent: Sep. 9, 2025

(54) FREQUENCY HOPPING ENHANCEMENT FOR PARTIAL FREQUENCY SOUNDING

(71) Applicant: Apple Inc., Cupertino, CA (US)

(72) Inventors: Haitong Sun, Cupertino, CA (US); Chunxuan Ye, San Diego, CA (US); Dawei Zhang, Saratoga, CA (US); Huaning Niu, San Jose, CA (US); Seyed Ali Akbar Fakoorian, San Diego, CA (US); Wei Zeng, Saratoga, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/910,561

(22) PCT Filed: Sep. 24, 2021

(86) PCT No.: PCT/CN2021/120441
§ 371 (c)(1),
(2) Date: Sep. 9, 2022

(87) PCT Pub. No.: WO2023/044795
PCT Pub. Date: Mar. 30, 2023

(65) Prior Publication Data
US 2024/0204934 A1   Jun. 20, 2024

(51) Int. Cl.
*H04L 5/00*   (2006.01)

(52) U.S. Cl.
CPC .......... *H04L 5/0012* (2013.01); *H04L 5/0048* (2013.01); *H04L 5/0096* (2013.01)

(58) Field of Classification Search
CPC .... H04L 5/0012; H04L 5/0048; H04L 5/0096
See application file for complete search history.

(56) References Cited

U.S. PATENT DOCUMENTS

2020/0177342 A1   6/2020  Pawar et al.
2020/0213161 A1*  7/2020  Zhang ................... H04L 5/0048
(Continued)

FOREIGN PATENT DOCUMENTS

CN        111277389 A       6/2020
WO    WO-2022067802 A1 *   4/2022
(Continued)

OTHER PUBLICATIONS

Enhancements on SRS Flexibility, Coverage and Capacity, ZTE, 3GPP TSG RAN WG1 Meeting #106-e, R1-2106546, Aug. 16-27, 2021, 12 pages.
(Continued)

*Primary Examiner* — Shukri Taha
(74) *Attorney, Agent, or Firm* — Kilpatrick Townsend & Stockton LLP

(57) ABSTRACT

Provided is a method for a base station, includes: generating, for transmission to at least one UE, control information associated with SRS transmission, wherein the control information indicates an SRS band including a plurality of RBs for the SRS transmission, the control information indicates a first subband for a first UE and a second subband for a second UE in a same SRS band for an SRS transmission occasion; receiving, from the at least one UE, SRS on a plurality of SRS transmission occasions according to the control information, wherein a location hopping parameter is applied to the plurality of SRS transmission occasions, wherein a first starting location of the first subband for the first UE on a first SRS transmission occasion and a second
(Continued)

starting location of the first subband for the first UE on a second SRS transmission occasion are determined based on the location hopping parameter.

16 Claims, 15 Drawing Sheets

(56) References Cited

U.S. PATENT DOCUMENTS

| | | | |
|---|---|---|---|
| 2020/0259614 A1 | 8/2020 | Liu et al. | |
| 2020/0412582 A1 | 12/2020 | Manolakos et al. | |
| 2023/0050730 A1* | 2/2023 | Wang | H04L 5/0048 |
| 2023/0117977 A1* | 4/2023 | Sun | H04L 5/0053 370/329 |
| 2023/0246792 A1* | 8/2023 | Wang | H04L 5/0012 370/329 |
| 2023/0344590 A1* | 10/2023 | Manolakos | H04W 72/232 |
| 2024/0313913 A1* | 9/2024 | Gao | H04L 5/0012 |

FOREIGN PATENT DOCUMENTS

| | | | | |
|---|---|---|---|---|
| WO | WO-2023022143 A1 * | 2/2023 | | H04W 72/044 |
| WO | WO-2023051470 A1 * | 4/2023 | | H04B 1/713 |

OTHER PUBLICATIONS

FL Summary #1 on SRS Enhancements, Moderator (ZTE), 3GPP TSG RAN WG1 Meeting #106-e, R1-2108217, Aug. 16-27, 2021, 59 pages.
FL Summary #2 on SRS Enhancements, Moderator (ZTE), 3GPP TSG RAN WG1 Meeting #106-e, R1-2108373, Aug. 16-27, 2021, 29 pages.
FL Summary #3 on SRS Enhancements, Moderator (ZTE), 3GPP TSG RAN WG1 Meeting #106-e, R1-2108512, Aug. 16-27, 2021, 15 pages.
International Patent Application No. PCT/CN2021/120441, International Search Report and Written Opinion, Mailed on Jun. 17, 2022, 9 pages.
3rd Generation Partnership Project; Technical Specification Group Radio Access Network; NR; Physical channels and modulation (Release 16), 3GPP TS 38.211 V16.6.0, Jun. 2021, 134 pages.
Final Report of Online Meeting Apr. 12-20, 2021, MCC Support, 3GPP TSG RAN WG1 Meeting #105-e, R1-2104151, May 10-27, 2021, 141 pages.
Final Report of Online Meeting Aug. 16-27, 2021, MCC Support, 3GPP TSG RAN WG1 Meeting #105-e, R1-2110434, Oct. 11-19, 2021, 166 pages.
International Patent Application No. PCT/CN2021/120441, International Preliminary Report on Patentability, Apr. 4, 2024, 6 pages.
FL Summary #1 on SRS Enhancements, 3rd Generation Partnership Project Technical Specification Group-Radio Access Network Working Group1 Meeting #106-e e-Meeting, R1-2108217, Moderator (ZTE), Aug. 16-27, 2021, 59 pages.
UL Sounding RS Operation, 3Generation Partnership Project Technical Specification Group Radio Access Network Working Group1 #52bis, R1-081249, Mar. 31-Apr. 4, 2008, 6 pages.
China Patent Application No. 202180020475.5, Office Action, May 31, 2025, 9 pages.
European Patent Application No. 21957920.8, Partial Supplementary European Search Report, Apr. 30, 2025, 13 pages.

* cited by examiner

200

S202: GENERATING, FOR TRANSMISSION TO AT LEAST ONE USER EQUIPMENT (UE), CONTROL INFORMATION ASSOCIATED WITH SOUNDING REFERENCE SIGNAL (SRS) TRANSMISSION, WHEREIN THE CONTROL INFORMATION INDICATES AN SRS BAND INCLUDING A PLURALITY OF RESOURCE BLOCKS (RBS) FOR THE SRS TRANSMISSION, AND THE CONTROL INFORMATION FURTHER INDICATES A FIRST SUBBAND FOR A FIRST UE AND A SECOND SUBBAND FOR A SECOND UE IN A SAME SRS BAND FOR A SRS TRANSMISSION OCCASION

S204: RECEIVING, FROM THE AT LEAST ONE UE, SRS ON A PLURALITY OF SRS TRANSMISSION OCCASIONS ACCORDING TO THE CONTROL INFORMATION

FIG. 2

| Slot Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| SRS Frequency Location | | | | | | | ■ | | | | | | | | ■ | |
| | | | ■ | | | | | | | | ■ | | | | | |

FIG. 5

FREQUENCY HOPPING ENHANCEMENT FOR PARTIAL FREQUENCY SOUNDING

CROSS REFERENCE TO RELATED APPLICATION

This application is a 371 U.S. National Phase of PCT International Patent Application No. PCT/CN2021/120441, filed Sep. 24, 2021, which is herein incorporated by reference in its entirety for all purposes.

TECHNICAL FIELD

This application relates generally to wireless communication systems, and more specifically to frequency hopping enhancement for partial frequency sounding.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard: the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to an aspect of the present disclosure, a method for a base station is provided that comprises generating, for transmission to at least one user equipment (UE), control information associated with sounding reference signal (SRS) transmission, wherein the control information indicates an SRS band including a plurality of resource blocks (RBs) for the SRS transmission, and the control information further indicates a first subband for a first UE and a second subband for a second UE in a same SRS band for an SRS transmission occasion; and receiving, from the at least one UE, SRS on a plurality of SRS transmission occasions according to the control information, wherein a location hopping parameter is applied to the plurality of SRS transmission occasions, wherein a first starting location of the first subband for the first UE on a first SRS transmission occasion and a second starting location of the first subband for the first UE on a second SRS transmission occasion are determined based on the location hopping parameter.

According to an aspect of the present disclosure, a method for a user equipment is provided that comprises receiving, from a base station, control information associated with sounding reference signal (SRS) transmission, wherein the control information indicates an SRS band including a plurality of resource blocks (RBs), and the control information further indicates a subband for the UE in the SRS band for an SRS transmission occasion; transmitting, to the base station, SRS on a plurality of SRS transmission occasions according to the control information, wherein a location hopping parameter is applied to the plurality of SRS transmission occasions, wherein a first starting location of the subband for the UE on a first SRS transmission occasion and a second starting location of the subband for the first UE on a second SRS transmission occasion are determined based on the location hopping parameter.

According to an aspect of the present disclosure, an apparatus for a user equipment (UE) is provided that comprises: one or more processors configured to perform steps of the above-mentioned method of the user equipment.

According to an aspect of the present disclosure, an apparatus for base station that comprises: one or more processors configured to perform steps of the above-mentioned method of the base station.

According to an aspect of the present disclosure, it is provided a computer readable medium having computer programs stored thereon which, when executed by one or more processors, cause an apparatus to perform steps of the above-mentioned method.

According to an aspect of the present disclosure, it is provided a computer program product comprising computer programs which, when executed by one or more processors, cause an apparatus to perform steps of the above-mentioned method.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

FIG. 2 illustrates a flowchart for an exemplary method for a base station in accordance with some embodiments.

FIG. 5 illustrates exemplary SRS frequency locations in accordance with some embodiments of the present disclosure.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

In wireless system, sounding reference signals (SRS) are transmitted on the uplink and allow the network to estimate the quality of the channel at different frequencies. SRS can only be transmitted in the last 6 symbols of each slot in Rel-15. For unlicensed NR (NR-U) and NR positioning, SRS can be transmitted in any symbol in Rel-16. SRS can be repeated up to 4 symbols with a simple repetition without any cover code in Rel-15 and Rel-16 NR. Aperiodic SRS can be triggered by UL DCI (DCI Format 0_1, 0_2), DL DCI (DCI Format 1_1, 1_2) or special DCI (DCI Format 2_3).

In order to overcome the deficiencies of SRS design in Rel-15 and Rel-16, RB-level partial frequency sounding (RPFS) was agreed as part of Rel-17 and enhanced frequency hopping was also agreed for RPFS. In frequency hopping enhancement for RPFS, start RB location ($N_{offset}$) hopping are supported in different SRS frequency hopping periods for RPFS and at least for periodic or semi-persistent SRS. For a given SRS transmission occasion.

$$N_{offset} = \frac{(k_F + k_{hopping}) \bmod P_F}{P_F} m_{SRS,B_{SRS}},$$

where $P_F$ is the ratio of partial frequency sounding, i.e., ratio between the actual number of RBs in which UE transmits SRS and the total number of RBs configured for SRS. In other words, $P_F$ is the number of SRS subbands in the SRS band. $k_F = \{0, 1, \ldots P_F - 1\}$. $m_{SRS,B_{SRS}}$ determines the full SRS transmission band size, and the location hopping parameter $k_{hopping}$ is same for all SRS occasions within a legacy frequency hopping period but changes across legacy frequency hopping periods. $P_F$ may indicate a number of UEs which may transmit SRS in a same SRS occasion.

In order to realize frequency hopping enhancement for RB-level partial frequency sounding for at least one UE in several transmission occasions, a method for frequency hopping design is provided in this disclosure. Frequency hopping can be implemented for periodic/semi-persistent/aperiodic SRS transmission occasion and inter-slot/intra-slot SRS transmission occasion with the method disclosed herein. In this way, the at least one UE can be monitored at different frequency in a full SRS band, which not only provide a good anti-interference effect, but also can effectively improve the quality of communication.

Figure 1:
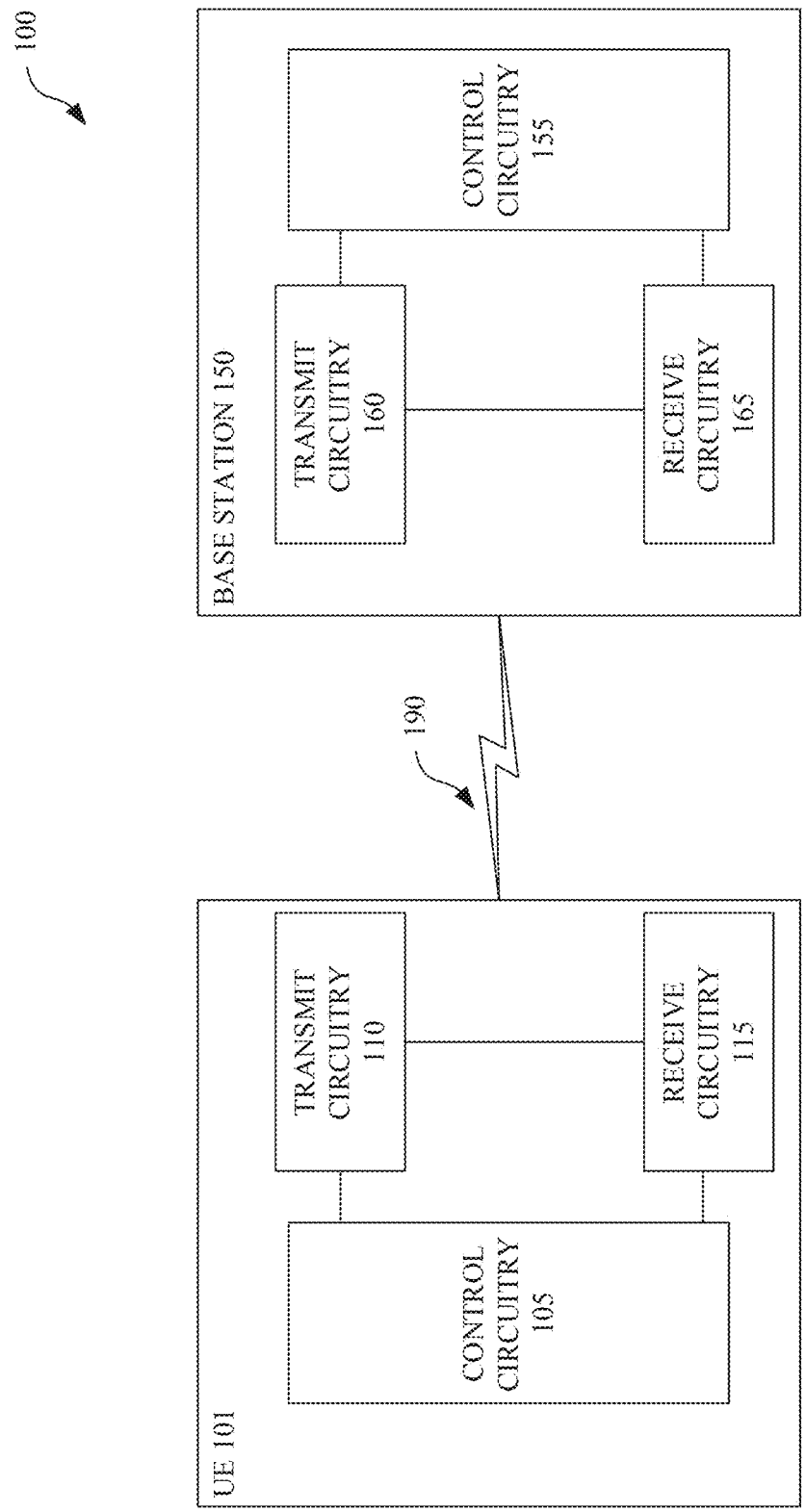
FIG. 1 is a block diagram of a system including a base station and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the base station 150, for example, includes three sectors each covering a 120-degree area with an array of antennas directed to each sector to provide 360-degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g. messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person to person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is comprised of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is comprised of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

FIG. 2 illustrates a flowchart for an exemplary method for a base station in accordance with some embodiments. The method 200 illustrated in FIG. 2 may be implemented by the base station 150 described in FIG. 1.

At step 202, the base station may generate, for transmission to at least one user equipment (UE), control information associated with sounding reference signal (SRS) transmission, wherein the control information indicates an SRS band including a plurality of resource blocks (RBs) for the SRS transmission, and the control information may further indicate a first subband for a first UE and a second subband for a second UE in a same SRS band for an SRS transmission occasion.

The plurality of resource blocks (RBs) may be configured for SRS transmission of different UEs. The size of the SRS band i.e., the number of the plurality of RBs may be determined by $m_{SRS,B_{SRS}}$. The first subband may be a first subset of consecutive RBs in the plurality of RBs. The second subband may be a second subset of consecutive RBs, which is different from the first subband, in the plurality of RBs. For example, for an SRS band of 8 RBs, the first 4 RBs may be determined as the first subband and may be used for SRS transmission for the first UE, and the second 4 RBs may be determined as the second subband and may be used for SRS transmission for the second UE. A starting offset parameter may be determined for the first UE and the second UE to indicate a starting location of the first UE and a starting location of the second UE in the SRS band.

At step 204, the base station may receive, from the at least one UE, SRS on a plurality of SRS transmission occasions according to the control information.

A location hopping parameter may applied to the plurality of SRS transmission occasions, wherein a first starting location of the first subband for the first UE on a first SRS transmission occasion and a second starting location of the first subband for the first UE on a second SRS transmission occasion are determined based on the location hopping parameter.

Also, a first starting location of the second subband for the second UE on the first SRS transmission occasion and a second starting location of the second subband for the second UE on the second SRS transmission occasion may be determined based on the location hopping parameter. In this way, the starting location of the second UE may change in a similar way with the first UE to avoid collision.

Figure 3:
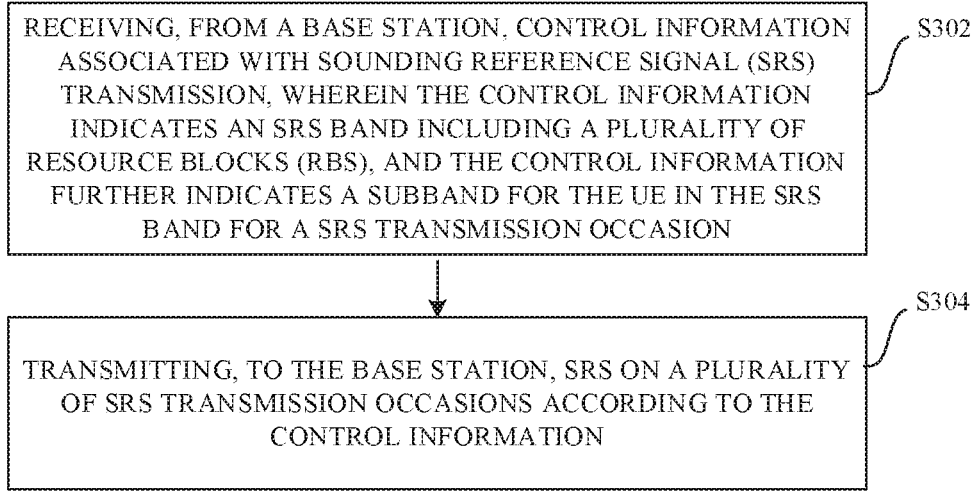
FIG. 3 illustrates a flowchart for an exemplary method for a user device in accordance with some embodiments.

FIG. 3 illustrates a flowchart for an exemplary method for a user device in accordance with some embodiments. The method 300 illustrated in FIG. 3 may be implemented by the UE 101 described in FIG. 1.

At step S302, the UE may receive, from a base station, control information associated with sounding reference signal (SRS) transmission. The control information may indicate an SRS band including a plurality of resource blocks (RBs), and the control information further indicates a subband for the UE in the SRS band for an SRS transmission occasion.

The plurality of resource blocks (RBs) may be configured for SRS transmission of different UEs. The size of the SRS band may be determined by $m_{SRS,B_{SRS}}$. The subband for the UE may be a subset of consecutive RBs in the SRS band. Another subband in the SRS band may be determined for another UE for partial sounding.

At step S304, the UE may transmit, to the base station, SRS on a plurality of SRS transmission occasions according to the control information.

A location hopping parameter may be applied to the plurality of SRS transmission occasions, wherein a first starting location of the subband for the UE on a first SRS transmission occasion and a second starting location of the subband for the first UE on a second SRS transmission occasion are determined based on the location hopping parameter.

For the other UE transmitting SRS in the other subband, a first starting location of the other subband for the other UE on the first SRS transmission occasion and a second starting location of the other subband for the other UE on the second SRS transmission occasion may be determined based on the location hopping parameter. In this way, the starting location of the other UE may change in a similar way with the UE to avoid collision.

The SRS transmission may be a periodic SRS transmission or a semi-persistent SRS transmission or an aperiodic SRS transmission.

Figure 4:
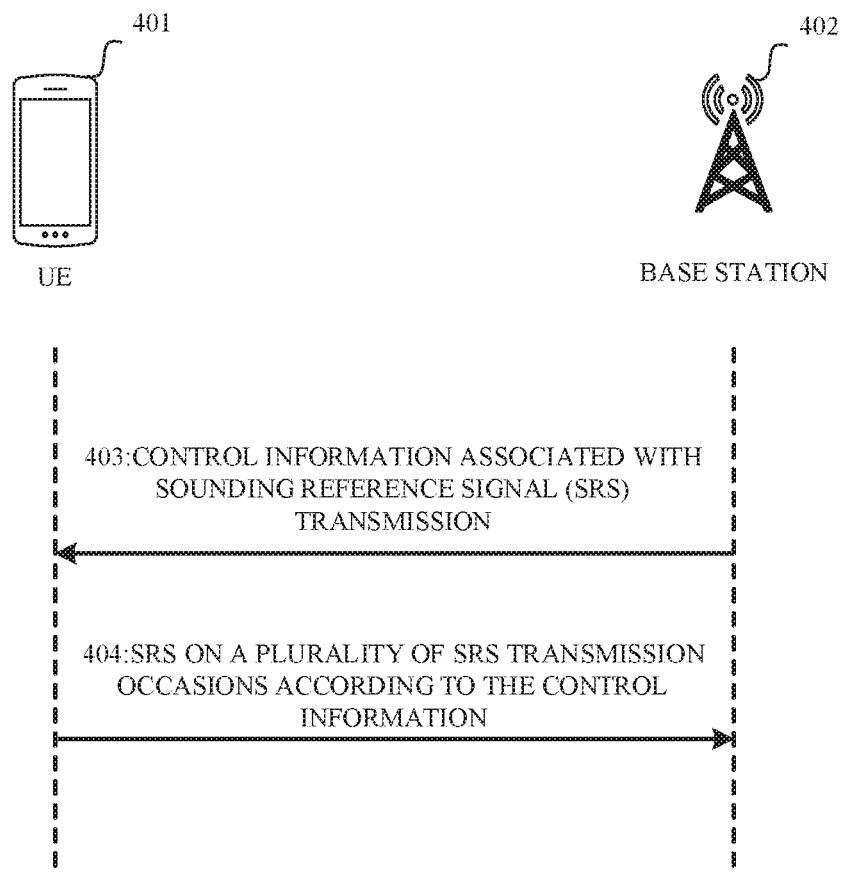
FIG. 4 illustrates an exemplary communication exchange between a base station and a UE in accordance with some embodiments of the present disclosure.

FIG. 4 illustrates an exemplary communication exchange between a base station and a UE in accordance with some embodiments of the present disclosure.

As shown in FIG. 4, the base station 402 may send the control information associated with sounding reference signal (SRS) transmission to the UE 401 at operation 403. The control information indicates an SRS band including a plurality of resource blocks (RBs) for the SRS transmission. The control information may further indicate a subband for the UE 401 in the SRS band for an SRS transmission occasion.

At operation 404, the UE 401 may send SRS on a plurality of SRS transmission occasions according to the control information to the base station 402. The SRS sent by the UE 401 may use the subband indicated in the control information. The location hopping parameter may be applied to the plurality of SRS transmission occasions. A first starting location of the subband for the UE on a first SRS transmission occasion and a second starting location of the subband for the first UE on a second SRS transmission occasion are determined based on the location hopping parameter.

According to the embodiments of the present disclosure, location hopping may be introduced for the SRS transmission occasions in RPFS. In this way, although a UE may only perform partial sounding in one SRS transmission occasion, sounding for the entire frequency range of the SRS band may be performed after several repetitions.

The location hopping parameter may indicate a frequency hopping for the first UE and the second UE in the same SRS transmission occasion. Following will illustrate configurations of the location hopping parameter in detail.

The location hopping parameter may be determined based on a step parameter S and an index I(k) associated with the SRS transmission occasions, where k is a sequence number of an SRS transmission occasion. The step parameter S may indicate a step size of the location hopping.

In some embodiments, the location hopping parameter may be determined by a linearly increasing function of the step parameter and the index associated with the SRS transmission occasions. For example, the location hopping parameter $k_{hopping}$ may be determined by equation (1) as follows:

$$k_{hopping}=S*I(k), \qquad (1)$$

wherein S represents the step parameter and I(k) represents the index associated with the k-th SRS transmission occasion.

It will be acknowledged that equation (1) is an exemplary function of the step parameter and the index associated with the SRS transmission occasions and the scope of the present disclosure is not limited thereto. Those skilled in the art may determine the location hopping parameter $k_{hopping}$ based on any possible variant of equation (1).

The index I(k) may be determined based on an index associated with the k-th transmission occasion in the SRS transmission.

For periodic or semi-persistent SRS transmission, the index associated with an SRS transmission occasion is one of the following: a slot index of a slot for the SRS transmission occasion: a first transmission index of the SRS transmission occasions within a radio frame; or a second transmission index of the SRS transmission occasion in the transmission occasions having a same frequency location within a radio frame.

FIG. 5 illustrates an exemplary periodic SRS transmission in accordance with the embodiments.

FIG. 5 shows four SRS transmission occasions which are show as solid grids. The UE may transmit SRS to the BS sequentially in the four SRS transmission occasions show in FIG. 5 from left to right.

As illustrated in FIG. 5, slot 2 is allocated for the $1^{st}$ SRS transmission occasion in the radio frame, and slot 6 is allocated for the $2^{nd}$ SRS transmission occasion. The $1^{st}$ SRS transmission occasion is at a first frequency location, and the $2^{nd}$ SRS transmission occasion is at a second frequency location which is different from the first frequency location.

In some embodiments, I(k) may be a slot index of a slot for the k-th SRS transmission occasion.

In the SRS transmission shown in FIG. 5, I(1) for the $1^{st}$ SRS transmission occasion may be determined as the index of its corresponding slot, i.e., 2. Similarly, I(2), I(3), I(4) for the $2^{nd}$, $3^{rd}$, and $4^{th}$ SRS transmission occasion may be determined as 6, 10, and 14, respectively.

In some implementations, I(k) may be a first transmission index of the k-th SRS transmission occasions within a radio frame. The first transmission index may be determined based on the sequence number of the k-th SRS transmission occasion. In the SRS transmission shown in FIG. 5, I(1), I(2), I(3), I(4) for the $1^{st}$, $2^{nd}$, $3^{rd}$, and $4^{th}$ SRS transmission occasion may be determined as 0, 1, 2, 3, respectively. The counting of the sequence number of the transmission occasion may restart for the SRS transmission occasion closest to a start (i.e., a boundary) of a Radio Frame.

In some other implementations, I(k) may be a second transmission index of the k-th SRS transmission occasion in the transmission occasions having a same frequency location within a radio frame. The second transmission index may be determined based on the sequence number of SRS transmission occasion at the same frequency location. As illustrated in FIG. 5, the $1^{st}$ SRS transmission occasion and the $3^{rd}$ SRS transmission occasion are at the first frequency location, and $2^{nd}$ SRS transmission occasion and the $4^{th}$ SRS transmission occasion are at the second frequency location. Thus, two SRS transmission occasion sequence may be formed at the first frequency location and the second frequency location, respectively. Based on a first SRS transmission occasion sequence at the first frequency location, I(1), I(3) for the $1^{st}$, $3^{rd}$ SRS transmission occasion may be determined as 0, 1, respectively. Similarly, based on a second SRS transmission occasion sequence at the second frequency location, I(2), I(4) for the $2^{nd}$, $4^{th}$ SRS transmission occasion may be determined as 0, 1, respectively. The counting of the sequence number of the transmission occasion in an SRS transmission occasion sequence at different frequency locations may restart for the SRS transmission occasion closest to a start (i.e., a boundary) of a Radio Frame.

For aperiodic SRS transmission, the index associated with a first SRS transmission occasion is one of the following: a third transmission index counting from a first triggered SRS: or a fourth transmission index based on an absolute location of the second SRS transmission in a radio frame.

In some embodiments, the index I(k) associated with the k-th SRS transmission occasion may be a third transmission index counting from a first triggered SRS. The third transmission index may be determined based on a sequence number of the k-th SRS transmission occasion in a sequence formed by triggered SRS transmission occasion. In other words, the index I(k) may be determined by counting from the first transmission occasion of the trigger-SRS.

In some other embodiments, the index I(k) associated with the k-th SRS transmission occasion may be a fourth transmission index based on an absolute location of the triggered SRS transmission in a radio frame. For example, I(k) is determined based on the slot index for the k-th SRS transmission occasion in the radio frame.

Step parameter S in equation (1) is another critical parameter for determining $k_{hopping}$. The step parameter may indicate a step size of the location hopping.

The step parameter S may be configured by RRC or hardcoded as table. In some embodiments, the step parameter is common for the plurality of SRS transmission occasions.

In some other embodiments, the step parameter may be different for different SRS transmission occasion. For example, the step parameter may include at least a first value for the first SRS transmission occasion and a second value different from the first value for the second SRS transmission occasion. The first value may be determined based on an index associated with the first SRS transmission occasion, and the second value may be determined based on an index associated with the second SRS transmission occasion.

In some implementations, step parameter S may be a fixed number. For example, S may be set to 1 or a prime number larger than 2. Furthermore, as mentioned above, at least a first UE and a second UE may transmit SRS to the BS in the same SRS transmission. Thus, the SRS band for SRS transmission may be divided into several portions, each portion being allocated to a certain UE. In some examples, the step parameter is smaller than the number of subbands in SRS band, i.e., $P_F$.

Figure 6A:
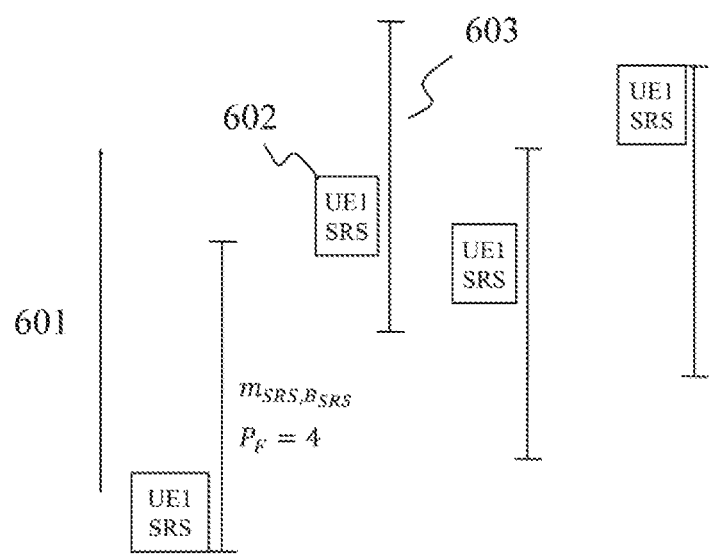
FIG. 6A illustrates exemplary frequency hopping when step parameter S=1 meanwhile l(k) may be a first transmission index of the first SRS transmission occasions within a radio frame in accordance with some embodiments.

FIG. 6A illustrates exemplary frequency hopping 600a when step parameter S=1 meanwhile I(k) may be a first transmission index of the first SRS transmission occasions within a radio frame in accordance with some embodiments. As shown in FIG. 6A, the line segment may represent an SRS band 603 including a plurality of resource blocks (RBs) for SRS transmission. The SRS band 603 may be evenly divided into 4 frequency hopping subbands, i.e., $P_F$=4, thus these 4 different subbands can be allocated for 4 different UEs' SRS transmission. The first starting location of the first subband for the first UE SRS 602 is shown in the leftmost part of FIG. 6A. With step parameter S=1, the first UE SRS 602 may realize frequency hopping in direction 601 (i.e., from down to top) with the step size of 1 within SRS band 603 in adjacent frequency hopping periods.

Figure 6B:
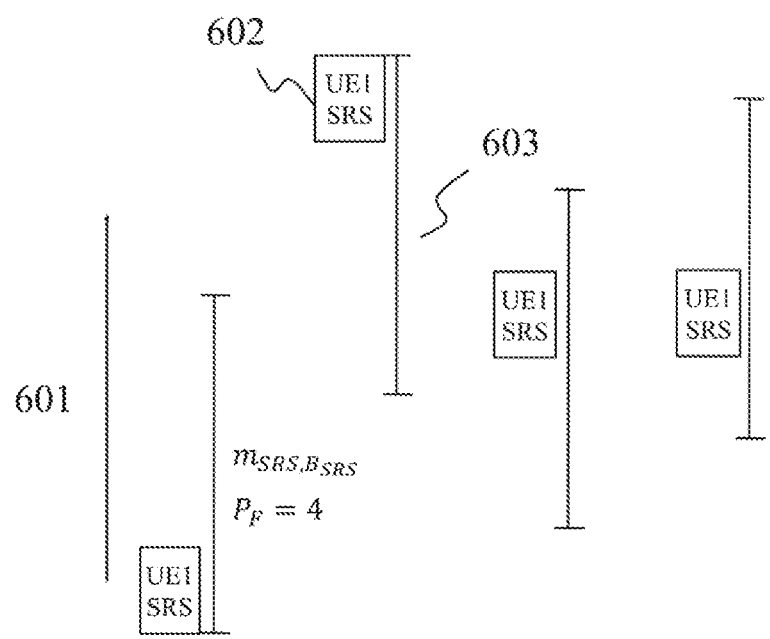
FIG. 6B illustrates exemplary frequency hopping when step parameter S=3 meanwhile I(k) may be a first transmission index of the first SRS transmission occasions within a radio frame in accordance with some embodiments.

FIG. 6B illustrates exemplary frequency hopping 600b when step parameter S=3 meanwhile I(k) may be a first transmission index of the first SRS transmission occasions within a radio frame in accordance with some embodiments. Similar to FIG. 6A, the SRS band 603 may also be evenly divided into 4 frequency hopping subbands, i.e., $P_F$=4. The first starting location of the first subband for the first UE SRS 602 is shown in the leftmost part of FIG. 6B. With step parameter S=3, the first UE SRS 602 may realize frequency hopping in direction 601 with the step size of 3 within SRS band 603 in adjacent frequency hopping periods.

Figure 6C:
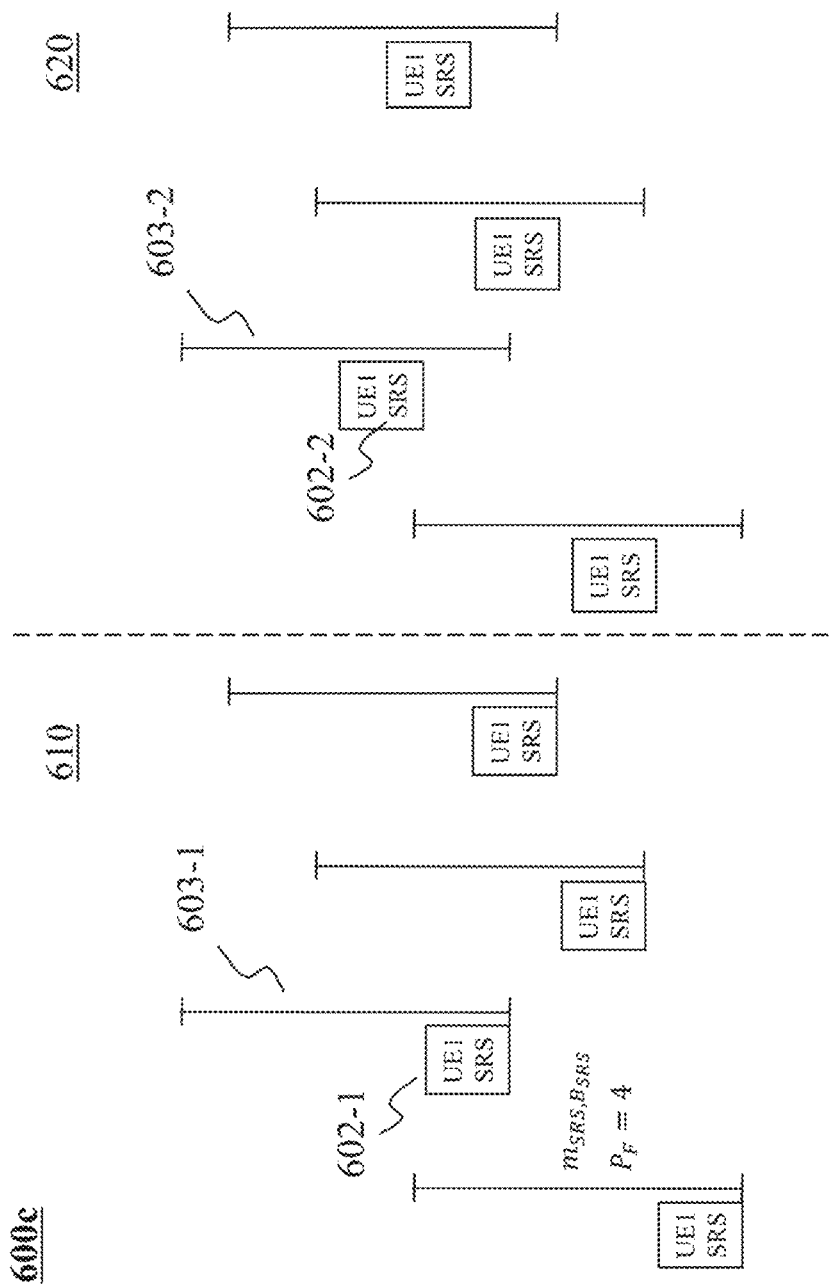
FIG. 6C and FIG. 6D illustrates exemplary frequency hopping when step parameter S=1 meanwhile I(k) may be a second transmission index of the first SRS transmission occasion in the transmission occasions having a same frequency location within a radio frame in accordance with some embodiments.
Figure 6D:
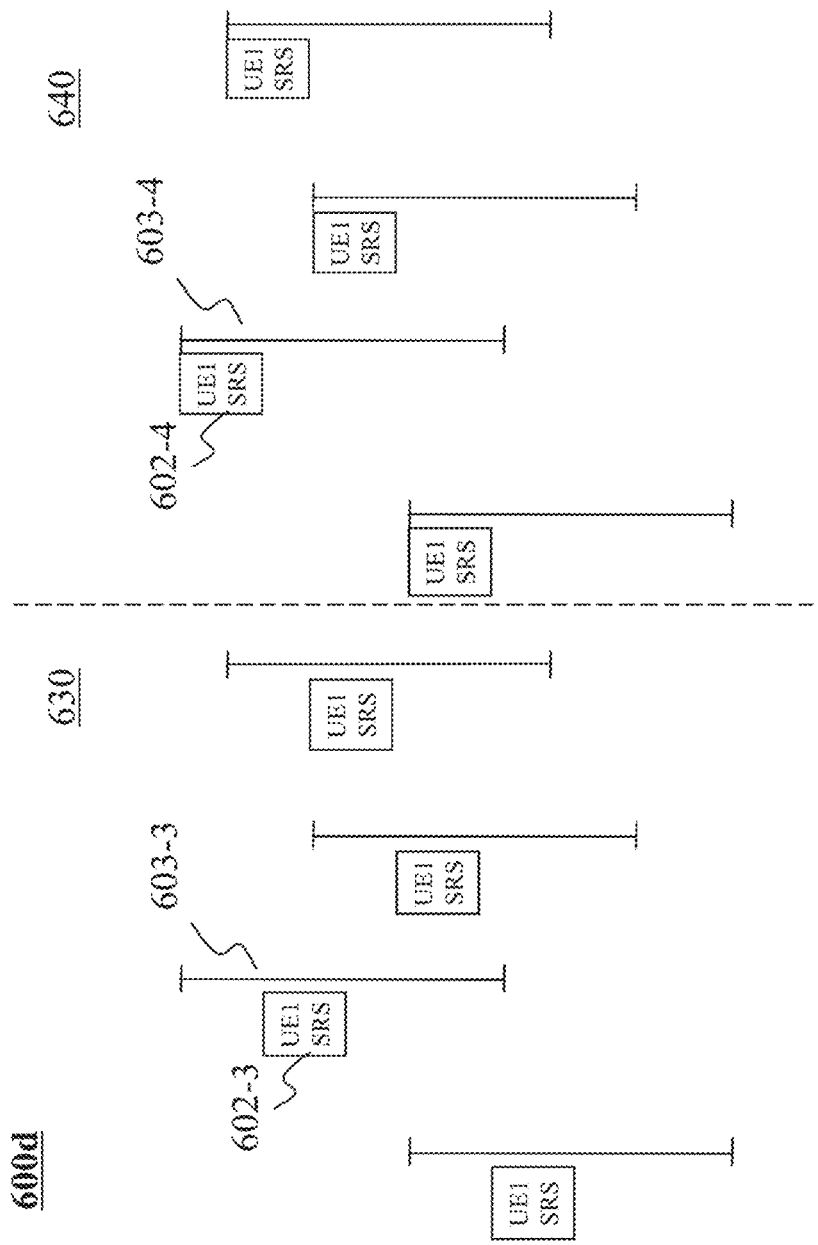

FIG. 6C and FIG. 6D illustrates exemplary frequency hopping 600c and 600d when step parameter S=1 meanwhile I(k) may be a second transmission index of the first SRS transmission occasion in the transmission occasions having a same frequency location within a radio frame in accordance with some embodiments. FIG. 6C and FIG. 6D shows 4 SRS periods 610~640. Similar to figure FIG. 6A and FIG. 6B, The SRS band 603 may also be evenly divided into 4 frequency hopping subbands, i.e., $P_F$=4. The first starting location of the first subband for the first UE SRS 602-1 in SRS period 610 is also the same as that in FIG. 6A and FIG. 6B. With step parameter S=1, the first UE SRS 602 that has the same frequency location within a radio frame, may realize frequency hopping in direction 601 with the step size of 1 within SRS band 603 in adjacent frequency hopping periods. For example, the starting location of UE 1 SRS 602-1, the UE 1 SRS 602-2, the UE 1 SRS 602-2 changes with a step size of 1 in SRS subband 603-1, 603-2, 603-3, and 603-4, respectively.

When the SRS band is evenly divided into 2 frequency hopping periods, i.e., $P_F$=2. A $k_{hopping}$ table may be configured as follows in Table 1:

TABLE 1

| | Frequency hopping period 0 | Frequency hopping period 1 |
|---|---|---|
| $k_{hopping}$ pattern 1 | 0 | 1 |
| $k_{hopping}$ pattern 2 | 1 | 0 |

For $P_F$=2, Table 1 may be unique and simple. Thus, the second pattern (pattern 2) may not be needed, because the second pattern may be essentially the same as the first pattern (pattern 1). The step parameter S can be set to a fixed size 1.

When the SRS band is evenly divided into 4 frequency hopping periods, i.e., $P_F$=4. knopping table may be configured as follows in Table 2:

TABLE 2

| | Frequency hopping period 0 | Frequency hopping period 1 | Frequency hopping period 2 | Frequency hopping period 3 |
|---|---|---|---|---|
| $k_{hopping}$ pattern 1 | 0 | 2 | 3 | 1 |
| $k_{hopping}$ pattern 2 | 0 | 2 | 1 | 3 |
| $k_{hopping}$ pattern 3 | 0 | 1 | 3 | 2 |
| $k_{hopping}$ pattern 4 | 0 | 3 | 1 | 2 |

In this case, when configuring the table, the hopping pattern may be a permutation of (0, 1, 2, 3), where the indices of 0, 1, 2, 3 represent a first portion, a second portion, a third portion, and a fourth portion of the SRS band. For example, for an SRS band of 8 RBs, the indices of 0, 1, 2, 3 represent a first portion (RB 0 and RB 1), a second portion (RB 2 and RB 3), a third portion (RB 4 and RB 5), and a fourth portion (RB 6 and RB 7) of the SRS band.

The step parameter S in the equation (1) can be considered as function of k, i.e., S(k). Taking $k_{hopping}$ pattern 4 in Table 2 as an example, the step parameter S(k) between frequency hopping period 0 and frequency hopping period 1 may be 3, the step parameter S(k) between frequency hopping period 1 and frequency hopping period 2 may be 2, the step parameter S(k) between frequency hopping period 2 and frequency hopping period 3 may be 1, and the step parameter S(k) between frequency hopping period 3 and frequency hopping period 0 may be 2.

For hopping pattern configuration, following methods may be applied:

In some embodiments, the location hopping parameter is configured per SRS-Resource. This configuration may be implemented by RRC. In this way, every time a certain SRS-Resource is triggered, a same $k_{hopping}$ pattern may be applied.

In some embodiments, the location hopping parameter is configured per SRS-ResourceSet. This configuration may be implemented by RRC. All the SRS-Resource in the same SRS-ResourceSet use the same location hopping parameter. In this way, every time a certain SRS-ResourceSet is triggered, a same $k_{hopping}$ pattern may be applied. Meanwhile, different $k_{hopping}$ patterns may be applied to a certain SRS-Resource if the certain SRS-Resource is included in different SRS-ResourceSets.

In some embodiments, the location hopping parameter is configured per aperiodic SRS trigger state. This configuration may be implemented by RRC. All the SRS-Resource in all the SRS-ResourceSet associated with the same AP-SRS trigger state use the same hopping pattern. In this way, a certain SRS-ResourceSet may belong to different AP-SRS trigger states, thus different $k_{hopping}$ patterns may be applied to the same SRS-ResourceSet by triggering different AP-SRS trigger state.

The location hopping parameter may be applied to each frequency hopping occasion, either for inter slot frequency hopping or for intra slot frequency hopping. For inter slot frequency hopping, the first SRS transmission occasion and the second SRS transmission occasion are configured for different slots. For intra slot frequency hopping, the first SRS transmission occasion and the second SRS transmission occasion are configured within a same slot.

When intra-slot frequency hopping is implemented, an intra slot frequency hopping parameter may be applied for the first SRS transmission occasion and the second SRS transmission occasion, and wherein the intra slot frequency hopping parameter indicates that different frequency ranges are allocated for the first SRS transmission occasion and the second SRS transmission occasion.

For example, at least one symbols in a slot may be configured for SRS transmission. In this case, SRS transmission may be applied in a single symbol or in multiple symbols. When considering intra slot frequency hopping, the intra slot frequency hopping parameter indicates an offset, either in a time domain or in a frequency domain, for the SRS transmission occasions within the same slot. For example, when a slot is divided into 4 symbol groups, the first symbol group may be applied to a first UE and the second symbol groups may be applied to a second UE. For another example, the first symbol group may be configured to transmit the SRS at a first frequency, and the second symbol group may be configured to transmit the SRS at a second frequency. Based on the same principle, the remaining symbol groups can be used for SRS transmission of other UEs. The intra slot frequency hopping parameter may indicate a subband within the same slot for the RPFS.

When determining the intra slot frequency hopping parameter, the intra slot frequency hopping parameter may be a linear increasing function or hardcoded as table. Similar to inter slot SRS transmission, when a linear increasing function is applied, the intra slot frequency hopping parameter $k_{intrahopping}$ may be determining by $k_{intrahopping} = S_{intra} * I(k)_{intra}$, wherein $S_{intra}$ represents the step parameter indicating the step size within a slot, e.g., 1 symbols, 3 symbols . . . and $I(k)_{intra}$ represents the index associated with the SRS transmission occasions. When a hardcoded table is applied for the intra slot frequency hopping parameter, the same hardcode method of inter slot SRS transmission may be implemented.

Figure 7:
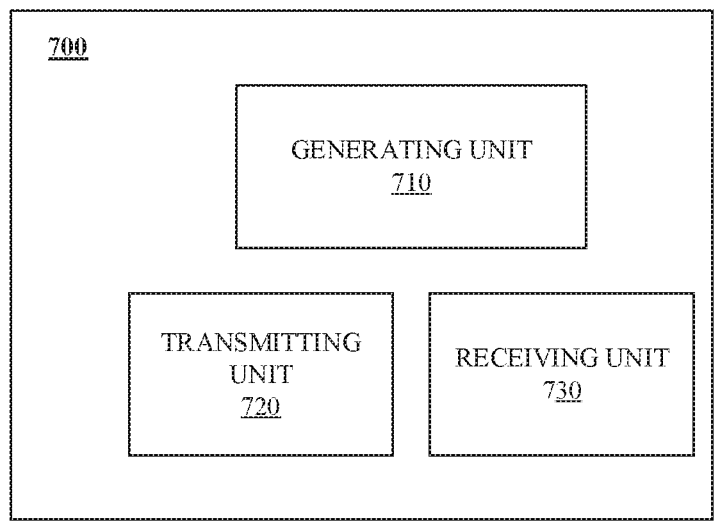
FIG. 7 illustrates an exemplary block diagram of an apparatus for a base station in accordance with some embodiments.

FIG. 7 illustrates an exemplary block diagram of an apparatus for a base station in accordance with some embodiments. The apparatus 700 illustrated in FIG. 7 may be used to implement the method 200 as illustrated in combination with FIG. 2.

As illustrated in FIG. 7, the apparatus 700 includes a control information generating unit 710, a transmitting unit 720 and a receiving unit 730.

Control information generating unit 710 may be configured to generate, for transmission to at least one user equipment (UE), control information associated with sounding reference signal (SRS) transmission, wherein the control information indicates an SRS band including a plurality of resource blocks (RBs) for the SRS transmission, and the control information further indicates a first subband for a first UE and a second subband for a second UE in a same SRS band for an SRS transmission occasion The transmitting unit 720 may be configured to transmit, to at least one user equipment (UE), control information associated with sounding reference signal (SRS) transmission.

The receiving unit 730 may be configured to receive, from the at least one UE, SRS on a plurality of SRS transmission occasions according to the control information, wherein a location hopping parameter is applied to the plurality of SRS transmission occasions, wherein a first starting location of the first subband for the first UE on a first SRS transmission occasion and a second starting location of the first subband for the first UE on a second SRS transmission occasion are determined based on the location hopping parameter.

Figure 8:
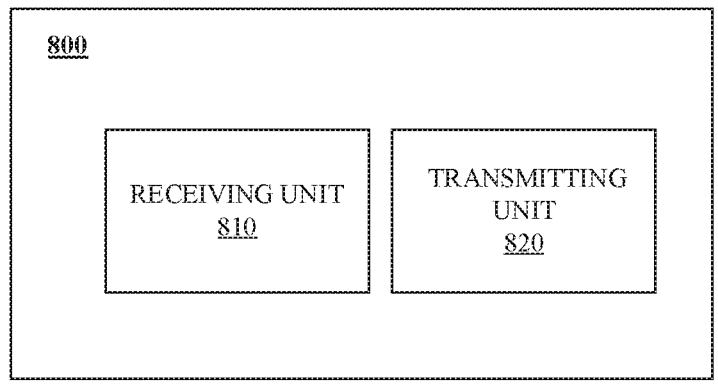
FIG. 8 illustrates an exemplary block diagram of an apparatus for UE in accordance with some embodiments.

FIG. 8 illustrates an exemplary block diagram of an apparatus for UE in accordance with some embodiments. The apparatus 800 illustrated in FIG. 8 may be used to implement the method 300 as illustrated in combination with FIG. 3.

As illustrated in FIG. 8, the apparatus 800 includes a receiving unit 810 and a transmitting unit 820.

The receiving unit 810 may be configured to receive, from a base station, control information associated with sounding reference signal (SRS) transmission, wherein the control information indicates an SRS band including a plurality of resource blocks (RBs), and the control information further indicates a subband for the UE in the SRS band for an SRS transmission occasion.

The transmitting unit 820 may be configured to transmit, to the base station, SRS on a plurality of SRS transmission occasions according to the control information, wherein a location hopping parameter is applied to the plurality of SRS transmission occasions, wherein a first starting location of the subband for the UE on a first SRS transmission occasion and a second starting location of the subband for the first UE on a second SRS transmission occasion are determined based on the location hopping parameter.

Figure 9:
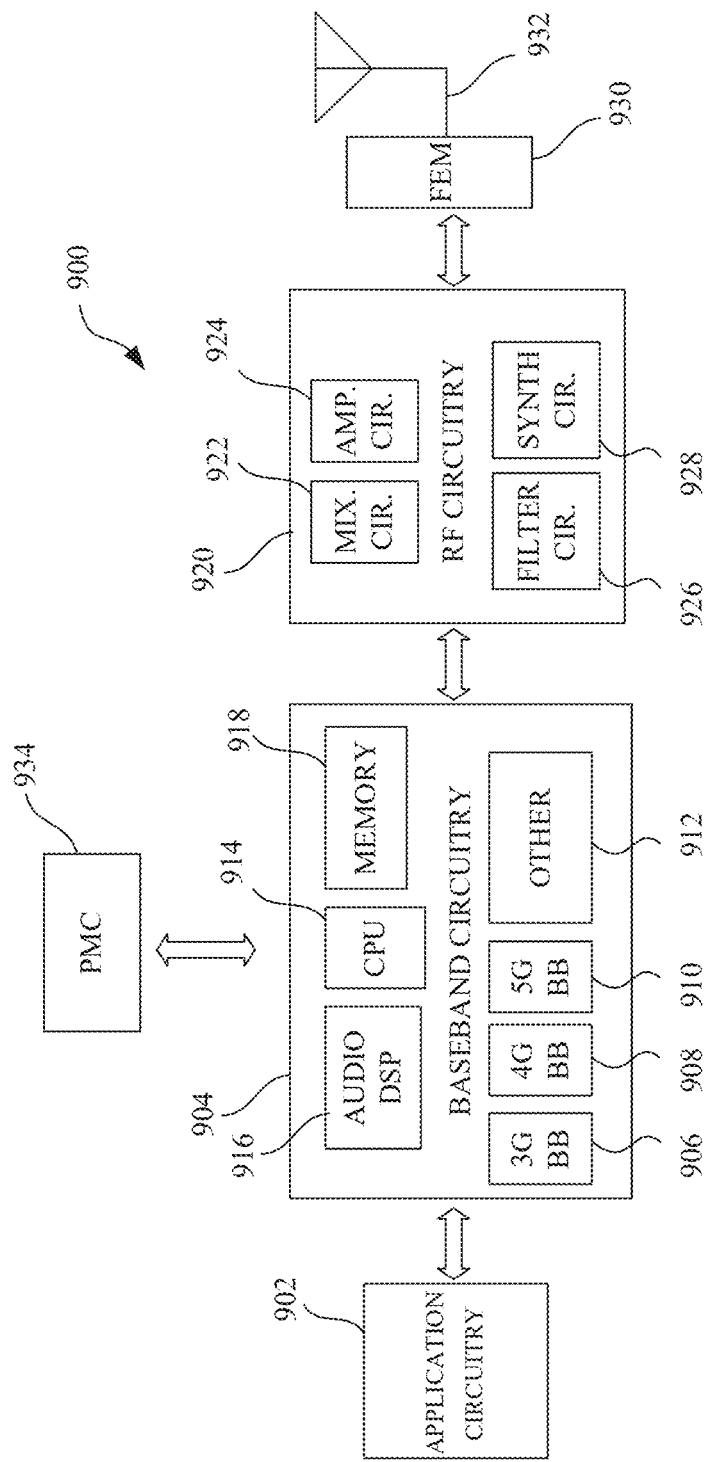
FIG. 9 illustrates example components of a device 900 in accordance with some embodiments.

FIG. 9 illustrates example components of a device 900 in accordance with some embodiments. In some embodiments, the device 900 may include application circuitry 902, baseband circuitry 904, Radio Frequency (RF) circuitry (shown as RF circuitry 920), front-end module (FEM) circuitry (shown as FEM circuitry 930), one or more antennas 932, and power management circuitry (PMC) (shown as PMC 934) coupled together at least as shown. The components of the illustrated device 900 may be included in a UE or a RAN node. In some embodiments, the device 900 may include fewer elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/ storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 920 and to generate baseband signals for a transmit signal path of the RF circuitry 920. The baseband circuitry 904 may interface with the application circuitry 902 for generation and processing of the baseband signals and for controlling operations of the RF circuitry 920. For example, in some embodiments, the baseband circuitry 904 may include a third generation (3G) baseband processor (3G baseband processor 906), a fourth generation (4G) baseband processor (4G baseband processor 908), a fifth generation (5G) baseband processor (5G baseband processor 910), or other baseband processor(s) 912 for other existing generations, generations in development or to be developed in the future (e.g., second generation (2G), sixth generation (6G), etc.). The baseband circuitry 904 (e.g., one or more of baseband processors) may handle various radio control functions that enable communication with one or more radio networks via the RF circuitry 920. In other embodiments, some or all of the functionality of the illustrated baseband processors may be included in modules stored in the memory 918 and executed via a Central Processing ETnit (CPET 914). The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include a digital signal processor (DSP), such as one or more audio DSP(s) 916. The one or more audio DSP(s) 916 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

The RF circuitry 920 may enable communication with wireless networks using modulated electromagnetic radiation through a non-solid medium. In various embodiments, the RF circuitry 920 may include switches, filters, amplifiers, etc. to facilitate the communication with the wireless network. The RF circuitry 920 may include a receive signal path which may include circuitry to down-convert RF signals received from the FEM circuitry 930 and provide baseband signals to the baseband circuitry 904. The RF circuitry 920 may also include a transmit signal path which may include circuitry to up-convert baseband signals provided by the baseband circuitry 904 and provide RF output signals to the FEM circuitry 930 for transmission.

In some embodiments, the receive signal path of the RF circuitry 920 may include mixer circuitry 922, amplifier circuitry 924 and filter circuitry 926. In some embodiments, the transmit signal path of the RF circuitry 920 may include filter circuitry 926 and mixer circuitry 922. The RF circuitry 920 may also include synthesizer circuitry 928 for synthesizing a frequency for use by the mixer circuitry 922 of the receive signal path and the transmit signal path. In some embodiments, the mixer circuitry 922 of the receive signal path may be configured to down-convert RF signals received from the FEM circuitry 930 based on the synthesized frequency provided by synthesizer circuitry 928. The amplifier circuitry 924 may be configured to amplify the down-converted signals and the filter circuitry 926 may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, the mixer circuitry 922 of the receive signal path may comprise passive mixers, although the scope of the embodiments is not limited in this respect.

In some embodiments, the mixer circuitry 922 of the transmit signal path may be configured to up-convert input baseband signals based on the synthesized frequency provided by the synthesizer circuitry 928 to generate RF output signals for the FEM circuitry 930. The baseband signals may be provided by the baseband circuitry 904 and may be filtered by the filter circuitry 926.

In some embodiments, the mixer circuitry 922 of the receive signal path and the mixer circuitry 922 of the transmit signal path may include two or more mixers and may be arranged for quadrature downconversion and upconversion, respectively. In some embodiments, the mixer circuitry 922 of the receive signal path and the mixer circuitry 922 of the transmit signal path may include two or more mixers and may be arranged for image rejection (e.g., Hartley image rejection). In some embodiments, the mixer circuitry 922 of the receive signal path and the mixer circuitry 922 may be arranged for direct downconversion and direct upconversion, respectively. In some embodiments, the mixer circuitry 922 of the receive signal path and the mixer circuitry 922 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 920 may include analog-to-digital converter (ADC) and digital-to-analog converter (DAC) circuitry and the baseband circuitry 904 may include a digital baseband interface to communicate with the RF circuitry 920.

In some dual-mode embodiments, a separate radio IC circuitry may be provided for processing signals for each spectrum, although the scope of the embodiments is not limited in this respect.

In some embodiments, the synthesizer circuitry 928 may be a fractional-N synthesizer or a fractional N/N+1 synthesizer, although the scope of the embodiments is not limited in this respect as other types of frequency synthesizers may be suitable. For example, synthesizer circuitry 928 may be a delta-sigma synthesizer, a frequency multiplier, or a synthesizer comprising a phase-locked loop with a frequency divider.

The synthesizer circuitry 928 may be configured to synthesize an output frequency for use by the mixer circuitry 922 of the RF circuitry 920 based on a frequency input and a divider control input. In some embodiments, the synthesizer circuitry 928 may be a fractional N/N+1 synthesizer.

In some embodiments, frequency input may be provided by a voltage controlled oscillator (VCO), although that is not a requirement. Divider control input may be provided by either the baseband circuitry 904 or the application circuitry 902 (such as an applications processor) depending on the desired output frequency. In some embodiments, a divider control input (e.g., N) may be determined from a look-up table based on a channel indicated by the application circuitry 902.

Synthesizer circuitry 928 of the RF circuitry 920 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 928 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 920 may include an IQ/polar converter.

The FEM circuitry 930 may include a receive signal path which may include circuitry configured to operate on RF signals received from one or more antennas 932, amplify the received signals and provide the amplified versions of the received signals to the RF circuitry 920 for further processing. The FEM circuitry 930 may also include a transmit signal path which may include circuitry configured to amplify signals for transmission provided by the RF circuitry 920 for transmission by one or more of the one or more antennas 932. In various embodiments, the amplification through the transmit or receive signal paths may be done solely in the RF circuitry 920, solely in the FEM circuitry 930, or in both the RF circuitry 920 and the FEM circuitry 930.

In some embodiments, the FEM circuitry 930 may include a TX/RX switch to switch between transmit mode and receive mode operation. The FEM circuitry 930 may include a receive signal path and a transmit signal path. The receive signal path of the FEM circuitry 930 may include an LNA to amplify received RF signals and provide the amplified received RF signals as an output (e.g., to the RF circuitry 920). The transmit signal path of the FEM circuitry 930 may include a power amplifier (PA) to amplify input RF signals (e.g., provided by the RF circuitry 920), and one or more filters to generate RF signals for subsequent transmission (e.g., by one or more of the one or more antennas 932).

In some embodiments, the PMC 934 may manage power provided to the baseband circuitry 904. In particular, the PMC 934 may control power-source selection, voltage scaling, battery charging, or DC-to-DC conversion. The PMC 934 may often be included when the device 900 is capable of being powered by a battery, for example, when the device 900 is included in a UE. The PMC 934 may increase the power conversion efficiency while providing desirable implementation size and heat dissipation characteristics.

FIG. 9 shows the PMC 934 coupled only with the baseband circuitry 904. However, in other embodiments, the PMC 934 may be additionally or alternatively coupled with, and perform similar power management operations for, other components such as, but not limited to, the application circuitry 902, the RF circuitry 920, or the FEM circuitry 930.

In some embodiments, the PMC 934 may control, or otherwise be part of, various power saving mechanisms of the device 900. For example, if the device 900 is in an RRC Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used to execute Layer 3, Layer 2, or Layer 1 functionality, while processors of the application circuitry 902 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
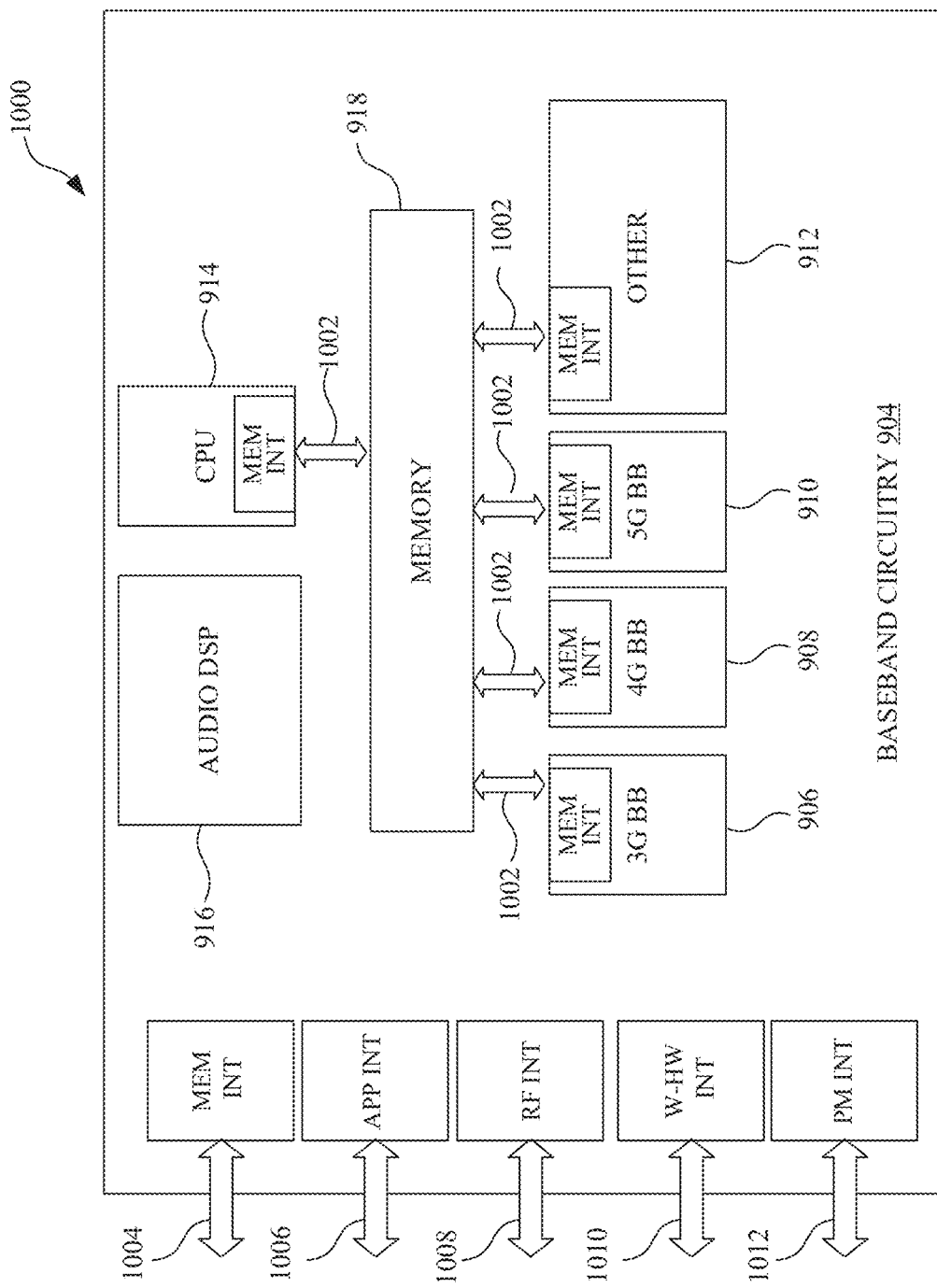
FIG. 10 illustrates example interfaces of baseband circuitry in accordance with some embodiments.

FIG. 10 illustrates example interfaces 1000 of baseband circuitry in accordance with some embodiments. As discussed above, the baseband circuitry 904 of FIG. 9 may comprise 3G baseband processor 906, 4G baseband processor 908, 5G baseband processor 910, other baseband processor(s) 912, CPU 914, and a memory 918 utilized by said processors. As illustrated, each of the processors may include a respective memory interface 1002 to send/receive data to/from the memory 918.

The baseband circuitry 904 may further include one or more interfaces to communicatively couple to other circuitries/devices, such as a memory interface 1004 (e.g., an interface to send/receive data to/from memory external to the baseband circuitry 904), an application circuitry interface 1006 (e.g., an interface to send/receive data to/from the application circuitry 902 of FIG. 9), an RF circuitry interface 1008 (e.g., an interface to send/receive data to/from RF circuitry 720 of FIG. 9), a wireless hardware connectivity interface 1010 (e.g., an interface to send/receive data to/from Near Field Communication (NFC) components, Bluetooth® components (e.g., Bluetooth® Low Energy), Wi-Fi®) components, and other communication components), and a power management interface 1012 (e.g., an interface to send/receive power or control signals to/from the PMC 934.

Figure 11:
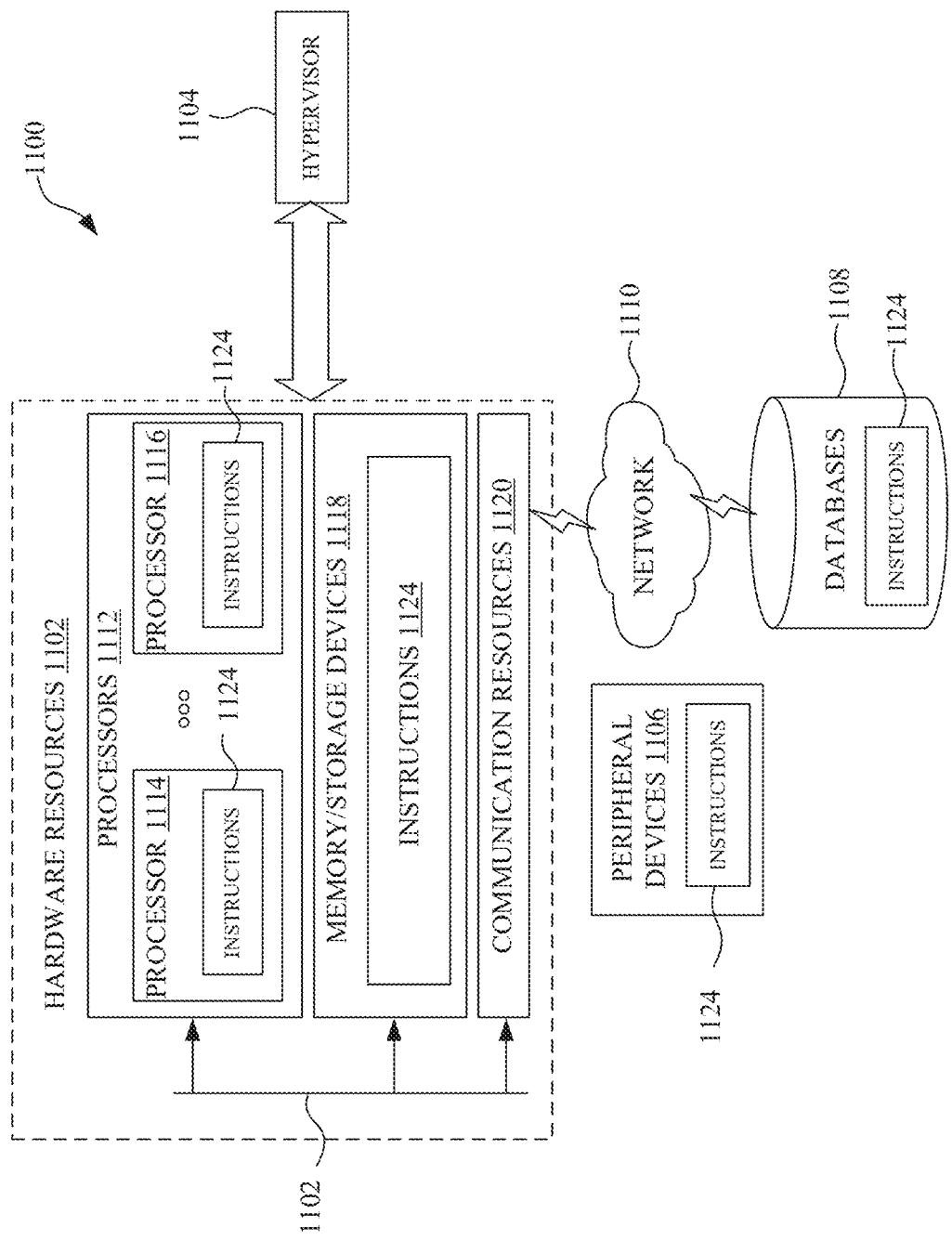
FIG. 11 illustrates components in accordance with some embodiments.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1102 including one or more processors 1112 (or processor cores), one or more memory/storage devices 1118, and one or more communication resources 1120, each of which may be communicatively coupled via a bus 1122. For embodiments where node virtualization (e.g., NFV) is utilized, a hypervisor 1104 may be executed to provide an execution environment for one or more network slices/sub-slices to utilize the hardware resources 1102.

The processors 1112 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1114 and a processor 1116.

The memory/storage devices 1118 may include main memory, disk storage, or any suitable combination thereof. The memory/storage devices 1118 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1120 may include interconnection or network interface components or other suitable devices to communicate with one or more peripheral devices 1106 or one or more databases 1108 via a network 1110. For example, the communication resources 1120 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1124 may comprise software, a program, an application, an applet, an app, or other executable code for causing at least any of the processors 1112 to perform any one or more of the methodologies discussed herein. The instructions 1124 may reside, completely or partially, within at least one of the processors 1112 (e.g., within the processor's cache memory), the memory/storage devices 1118, or any suitable combination thereof. Furthermore, any portion of the instructions 1124 may be transferred to the hardware resources 1102 from any combination of the peripheral devices 1106 or the databases 1108. Accordingly, the memory of the processors 1112, the memory/storage devices 1118, the peripheral devices 1106, and the databases 1108 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 12:
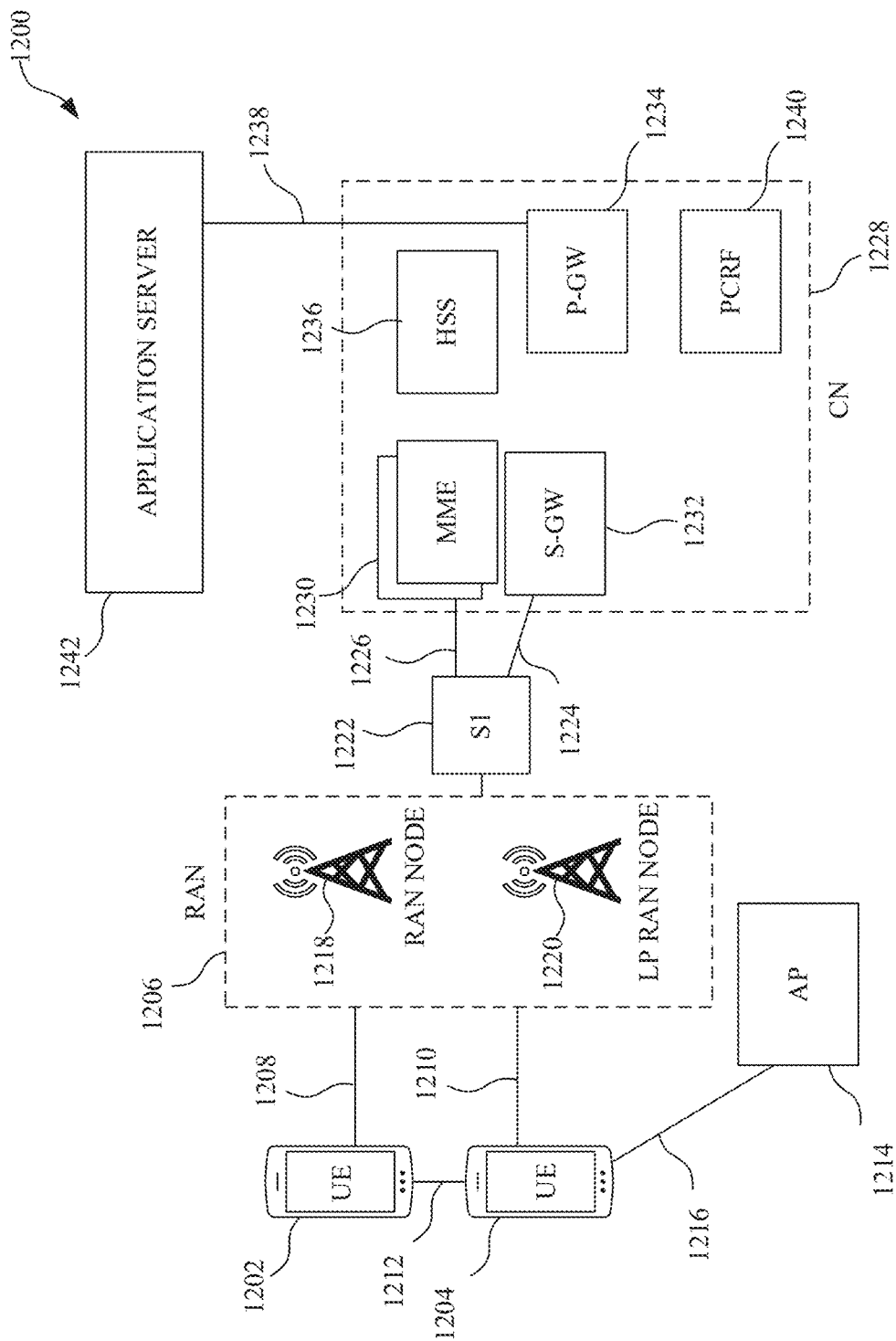
FIG. 12 illustrates an architecture of a wireless network in accordance with some embodiments.

FIG. 12 illustrates an architecture of a system 1200 of a network in accordance with some embodiments. The system 1200 includes one or more user equipment (UE), shown in this example as a UE 1202 and a UE 1204. The UE 1202 and the UE 1204 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 1202 and the UE 1204 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1202 and the UE 1204 may be configured to connect, e.g., communicatively couple, with a radio access network (RAN), shown as RAN 1206. The RAN 1206 may be, for example, an Evolved ETniversal Mobile Telecommunications System (ETMTS) Terrestrial Radio Access Network (E-UTRAN), a NextGen RAN (NG RAN), or some other type of RAN. The UE 1202 and the UE 1204 utilize connection 1208 and connection 1210, respectively, each of which comprises a physical communications interface or layer (discussed in further detail below); in this example, the connection 1208 and the connection 1210 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1202 and the UE 1204 may further directly exchange communication data via a ProSe interface 1212. The ProSe interface 1212 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1204 is shown to be configured to access an access point (AP), shown as AP 1214, via connection 1216. The connection 1216 can comprise a local wireless connection, such as a connection consistent with any IEEE 802.11 protocol, wherein the AP 1214 would comprise a wireless fidelity (WiFi®) router. In this example, the AP 1214 may be connected to the Internet without connecting to the core network of the wireless system (described in further detail below).

The RAN 1206 can include one or more access nodes that enable the connection 1208 and the connection 1210. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1206 may include one or more RAN nodes for providing macrocells, e.g., macro RAN node 1218, and one or more RAN nodes for providing femtocells or picocells (e.g., cells having smaller coverage areas, smaller user capacity, or higher bandwidth compared to macrocells), e.g., a low power (LP) RAN node such as LP RAN node 1220.

Any of the macro RAN node 1218 and the LP RAN node 1220 can terminate the air interface protocol and can be the first point of contact for the UE 1202 and the UE 1204. In some embodiments, any of the macro RAN node 1218 and the LP RAN node 1220 can fulfill various logical functions for the RAN 1206 including, but not limited to, radio network controller (RNC) functions such as radio bearer management, uplink and downlink dynamic radio resource management and data packet scheduling, and mobility management.

In accordance with some embodiments, the UE 1202 and the UE 1204 can be configured to communicate using Orthogonal Frequency-Division Multiplexing (OFDM) communication signals with each other or with any of the macro RAN node 1218 and the LP RAN node 1220 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal sub carriers.

In some embodiments, a downlink resource grid can be used for downlink transmissions from any of the macro RAN node 1218 and the LP RAN node 1220 to the UE 1202 and the UE 1204, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements: in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1202 and the UE 1204. The physical downlink control channel (PDCCH) may carry information about the transport format and resource allocations related to the PDSCH channel, among other things. It may also inform the UE 1202 and the UE 1204 about the transport format, resource allocation, and H-ARQ (Hybrid Automatic Repeat Request) information related to the uplink shared channel. Typically, downlink scheduling (assigning control and shared channel resource blocks to the UE 1204 within a cell) may be performed at any of the macro RAN node 1218 and the LP RAN node 1220 based on channel quality information fed back from any of the UE 1202 and UE 1204. The downlink resource assignment information may be sent on the PDCCH used for (e.g., assigned to) each of the UE 1202 and the UE 1204.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1206 is communicatively coupled to a core network (CN), shown as CN 1228—via an SI interface 1222. In embodiments, the CN 1228 may be an evolved packet core (EPC) network, a NextGen Packet Core (NPC) network, or some other type of CN. In this embodiment the SI interface 1222 is split into two parts: the SI-U interface 1224, which carries traffic data between the macro RAN node 1218 and the LP RAN node 1220 and a serving gateway (S-GW), shown as S-GW 1232, and an SI-mobility management entity (MME) interface, shown as SI-MME interface 1226, which is a signaling interface between the macro RAN node 1218 and LP RAN node 1220 and the MME(s) 1230.

In this embodiment, the CN 1228 comprises the MME(s) 1230, the S-GW 1232, a Packet Data Network (PDN) Gateway (P-GW) (shown as P-GW 1234), and a home subscriber server (HSS) (shown as HSS 1236). The MME(s) 1230 may be similar in function to the control plane of legacy Serving General Packet Radio Service (GPRS) Support Nodes (SGSN). The MME(s) 1230 may manage mobility aspects in access such as gateway selection and tracking area list management. The HSS 1236 may comprise a database for network users, including subscription-related information to support the network entities' handling of communication sessions. The CN 1228 may comprise one or several HSS 1236, depending on the number of mobile subscribers, on the capacity of the equipment, on the organization of the network, etc. For example, the HSS 1236 can provide support for routing/roaming, authentication, authorization, naming/addressing resolution, location dependencies, etc.

The S-GW 1232 may terminate the SI interface 322 towards the RAN 1206, and routes data packets between the RAN 1206 and the CN 1228. In addition, the S-GW 1232 may be a local mobility anchor point for inter-RAN node handovers and also may provide an anchor for inter-3 GPP mobility. Other responsibilities may include lawful intercept, charging, and some policy enforcement.

The P-GW 1234 may terminate an SGi interface toward a PDN. The P-GW 1234 may route data packets between the CN 1228 (e.g., an EPC network) and external networks such as a network including the application server 1242 (alternatively referred to as application function (AF)) via an Internet Protocol (IP) interface (shown as IP communications interface 1238). Generally, an application server 1242 may be an element offering applications that use IP bearer resources with the core network (e.g., ETMTS Packet Services (PS) domain, LTE PS data services, etc.). In this embodiment, the P-GW 1234 is shown to be communicatively coupled to an application server 1242 via an IP communications interface 1238. The application server 1242 can also be configured to support one or more communication services (e.g., Voice-over-Internet Protocol (VOIP) sessions, PTT sessions, group communication sessions, social networking services, etc.) for the UE 1202 and the UE 1204 via the CN 1228.

The P-GW 1234 may further be a node for policy enforcement and charging data collection. A Policy and Charging Enforcement Function (PCRF) (shown as PCRF 1240) is the policy and charging control element of the CN 1228. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1240 may be communicatively coupled to the application server 1242 via the P-GW 1234. The application server 1242 may signal the PCRF 1240 to indicate a new service flow and select the appropriate Quality of Service (QOS) and charging parameters. The PCRF 1240 may provision this rule into a Policy and Charging Enforcement Function (PCEF) (not shown) with the appropriate traffic flow template (TFT) and QoS class of identifier (QCI), which commences the QoS and charging as specified by the application server 1242.

ADDITIONAL EXAMPLES

For one or more embodiments, at least one of the components set forth in one or more of the preceding figures may be configured to perform one or more operations, techniques, processes, and/or methods as set forth in the example section below. For example, the method of SRS transmission as described above in connection with one or more of the preceding figures may be configured to operate in accordance with one or more of the examples set forth below. For another example, location hopping parameter as described above in connection with one or more of the preceding figures may be configured to operate in accordance with one or more of the examples set forth below in the example section. The following examples pertain to further embodiments.

Example 1 is a method of a base station (BS), comprising: generating, for transmission to at least one user equipment (UE), control information associated with sounding reference signal (SRS) transmission, wherein the control information indicates an SRS band including a plurality of resource blocks (RBs) for the SRS transmission, and the control information further indicates a first subband for a first UE and a second subband for a second UE in a same SRS band for an SRS transmission occasion: and receiving, from the at least one UE, SRS on a plurality of SRS transmission occasions according to the control information, wherein a location hopping parameter is applied to the plurality of SRS transmission occasions, wherein a first starting location of the first subband for the first UE on a first SRS transmission occasion and a second starting location of the first subband for the first UE on a second SRS transmission occasion are determined based on the location hopping parameter.

Example 2 is the method of Example 1, wherein a first starting location of the second subband for the second UE on the first SRS transmission occasion and a second starting location of the second subband for the second UE on the second SRS transmission occasion are determined based on the location hopping parameter.

Example 3 is the method of Example 1, wherein the location hopping parameter is determined based on a step parameter and an index associated with the SRS transmission occasions.

Example 4 is the method of Example 1, wherein the location hopping parameter is determined by a linearly increasing function of the step parameter and the index associated with the SRS transmission occasions.

Example 5 is the method of Example 4, wherein the SRS transmission is periodic or semi-persistent, and the index associated with a first SRS transmission occasion is one of the following: a slot index of a slot for the first SRS transmission occasion; a first transmission index of the first SRS transmission occasions within a radio frame: or a second transmission index of the first SRS transmission occasion in the transmission occasions having a same frequency location within a radio frame.

Example 6 is the method of Example 4, wherein the SRS transmission is aperiodic, and the index associated with an SRS transmission occasion is one of the following: a third transmission index counting from a first triggered SRS: or a fourth transmission index based on an absolute location of the SRS transmission in a radio frame.

Example 7 is the method of any one of Examples 3-6, wherein the step parameter is common for the plurality of SRS transmission occasions.

Example 8 is the method of any one of Examples 3-6, wherein the step parameter includes at least a first value for the first SRS transmission occasion and a second value different from the first value for the second SRS transmission occasion.

Example 9 is the method of Example 8, wherein step parameter is configured by RRC or hardcoded as table.

Example 10 is the method of any one of Examples 7-9, wherein the step parameter is 1 or a prime number larger than 2.

Example 11 is the method of any one of Examples 7-10, wherein the step parameter is smaller than a number of subband configured in the SRS band.

Example 12 is the method of any one of Examples 1-11, wherein the location hopping parameter is configured per SRS-Resource.

Example 13 is the method of any one of Examples 1-11, wherein the location hopping parameter is configured per SRS-ResourceSet.

Example 14 is the method of any one of Examples 5-11, wherein the location hopping parameter is configured per aperiodic SRS trigger state.

Example 15 is the method of any one of Examples 1-14, wherein the first SRS transmission occasion and the second SRS transmission occasion are configured for different slots.

Example 16 is the method of any one of Examples 1-14, wherein the first SRS transmission occasion and the second SRS transmission occasion are configured within a same slot.

Example 17 is the method of Example 16, wherein an intra slot frequency hopping parameter is applied for the first SRS transmission occasion and the second SRS transmission occasion, and wherein the intra slot frequency hopping parameter indicates that different frequency ranges are allocated for the first SRS transmission occasion and the second SRS transmission occasion.

Example 18 is the method of Example 17, wherein the intra slot frequency hopping parameter indicates an offset for the SRS transmission occasions within the same slot.

Example 19 is the method of Example 18, wherein the intra slot frequency hopping parameter is a linear increasing function or hardcoded as table.

Example 20 is a method of a user equipment (UE), comprising: receiving, from a base station, control information associated with sounding reference signal (SRS) transmission, wherein the control information indicates an SRS band including a plurality of resource blocks (RBs), and the control information further indicates a subband for the UE in the SRS band for an SRS transmission occasion; transmitting, to the base station, SRS on a plurality of SRS transmission occasions according to the control information, wherein a location hopping parameter is applied to the plurality of SRS transmission occasions, wherein a first starting location of the subband for the UE on a first SRS transmission occasion and a second starting location of the subband for the first UE on a second SRS transmission occasion are determined based on the location hopping parameter.

Example 21 is the method of Example 20, wherein a first starting location of another subband for another UE on the first SRS transmission occasion and a second starting location of the other subband for the other UE on the second SRS transmission occasion are determined based on the location hopping parameter.

Example 22 is the method of Example 20, wherein the location hopping parameter is determined based on a step parameter and an index associated with the SRS transmission occasions.

Example 23 is the method of Example 20, wherein the location hopping parameter is determined by a linearly increasing function of the step parameter and the index associated with the SRS transmission occasions.

Example 24 is the method of Example 23, wherein the SRS transmission is periodic, and the index associated with an SRS transmission occasion is one of the following: a slot index of a slot for the SRS transmission occasion; a first transmission index of the SRS transmission occasions within a radio frame; or a second transmission index of the SRS transmission occasion in the transmission occasions having a same frequency location within a radio frame.

Example 25 is the method of Example 23, wherein the SRS transmission is aperiodic, and the index associated with an SRS transmission occasion is one of the following: a third transmission index counting from a first triggered SRS: or a fourth transmission index based on an absolute location of the SRS transmission in a radio frame.

Example 26 is the method of any one of Examples 22-25, wherein the step parameter is common for the plurality of SRS transmission occasions.

Example 27 is the method of any one of Examples 22-25, wherein the step parameter includes at least a first value for the first SRS transmission occasion and a second value different from the first value for the second SRS transmission occasion.

Example 28 is the method of Example 27, wherein step parameter is configured by RRC or hardcoded as table.

Example 29 is the method of any one of Examples 26-28, wherein the step parameter is 1 or a prime number larger than 2.

Example 30 is the method of any one of Examples 26-29, wherein the step parameter is smaller than a number of subband configured in the SRS band.

Example 31 is the method of any one of Examples 20-30, wherein the location hopping parameter is configured per SRS-Resource.

Example 32 is the method of any one of Examples 20-30, wherein the location hopping parameter is configured per SRS-ResourceSet.

Example 33 is the method of any one of Examples 24-30, wherein the location hopping parameter is configured per aperiodic SRS trigger state.

Example 34 is the method of any one of Examples 20-33, wherein the first SRS transmission occasion and the second SRS transmission occasion are configured for different slots.

Example 35 is the method of any one of Examples 20-33, wherein the first SRS transmission occasion and the second SRS transmission occasion are configured within a same slot.

Example 36 is the method of Example 35, wherein an intra slot frequency hopping parameter is applied for the first SRS transmission occasion and the second SRS transmission occasion, and wherein the intra slot frequency hopping parameter indicates that different frequency ranges are allocated for the first SRS transmission occasion and the second SRS transmission occasion.

Example 37 is the method of Example 36, wherein the intra slot frequency hopping parameter indicates an offset for the SRS transmission occasions within the same slot.

Example 38 is the method of Example 37, wherein the intra slot frequency hopping parameter is a linear increasing function or hardcoded as table.

Example 39 is an apparatus for a network, the apparatus comprising: one or more processors configured to perform steps of the method according to any of Examples 1-19.

Example 40 is an apparatus for a user equipment (UE), the apparatus comprising: one or more processors configured to perform steps of the method according to any of Examples 20-38.

Example 41 is A computer readable medium having computer programs stored thereon which, when executed by one or more processors of an apparatus, cause the apparatus to perform steps of the method according to any of Examples 1-38.

Example 42 is A computer program product comprising computer programs which, when executed by one or more processors of an apparatus, cause the apparatus to perform steps of the method according to any of Examples 1-38.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method comprising:
generating, for transmission to a user equipment (UE), control information associated with a sounding reference signal (SRS) transmission, wherein the control information indicates an SRS band including a plurality of resource blocks (RBs) for the SRS transmission, and the control information further indicates a first subband for the UE within the SRS band; and
receiving, from the at least one-UE, an SRS on a plurality of SRS transmission occasions according to the control information,
wherein:
a first starting location within the first subband for the SRS transmission in a first SRS transmission occasion and a second starting location of within the first subband for the SRS transmission in a second SRS transmission occasion are determined based on a location hopping parameter;
the location hopping parameter is determined based on a step parameter and a transmission occasion index; and
the transmission index is a first index associated with SRS transmission occasions that have the first subband at a first frequency location or a second index associated with SRS transmission occasions that have the first subband at a second frequency location.

2. The method of claim 1, wherein the first starting location is associated with the first frequency location and the second starting location is associated with the second frequency location.

3. The method of claim 1, wherein the transmission index restarts after an end of a radio frame.

4. The method of claim 1, wherein the location hopping parameter is determined by a linearly increasing function of the step parameter and the transmission index.

5. The method of claim 1, wherein the SRS transmission is a triggered aperiodic (AP)-SRS, and the transmission index is counted from a first transmission occasion of the triggered AP-SRS.

6. The method of claim 1, wherein the step parameter is 1; a prime number larger than 2; or is smaller than a number of subbands configured in the SRS band.

7. The method of claim 1, wherein the step parameter is common for the plurality of SRS transmission occasions.

8. The method of claim 1, wherein the step parameter includes at least a first value for the first SRS transmission occasion and a second value different from the first value for the second SRS transmission occasion.

9. The method of claim 1, wherein the location hopping parameter is configured per SRS-Resource, SRS-Resource-Set, or aperiodic SRS trigger state.

10. The method of claim 1, wherein the first SRS transmission occasion and the second SRS transmission occasion are configured within a same slot.

11. The method of claim 10, wherein the location hopping parameter is applied for the first SRS transmission occasion and the second SRS transmission occasion, and wherein the location hopping parameter indicates that different frequency ranges are allocated for the first SRS transmission occasion and the second SRS transmission occasion.

12. The method of claim 11, wherein the location hopping parameter indicates an offset for the first and second SRS transmission occasions.

13. A method comprising:
receiving an indication in a radio resource control (RRC) signal;
accessing a hopping pattern from a plurality of hopping patterns for resource block (RB)-level partial frequency sounding (RPFS) based on the indication;
identifying, based on the hopping pattern, frequency portions within an SRS band in a plurality of sounding reference signal (SRS) transmission occasions; and
outputting an SRS in the frequency portions within the SRS band in the plurality of SRS transmission occasions;
wherein the hopping pattern is based on four frequency hopping (FH) periods, the plurality of SRS transmission occasions includes first, second, third, and fourth SRS transmission occasions, and the hopping pattern indicates the SRS:
in the first SRS transmission occasion in a first FH period of the four FH periods is to be transmitted on a first frequency portion of the SRS band having an index of zero;
in the second SRS transmission occasion in a second FH period of the four FH periods is to be transmitted on a second frequency portion of the SRS band having an index of two;
in the third SRS transmission occasion in a third FH period of the four FH periods is to be transmitted on a third frequency portion of the SRS band having an index of one; and
in the fourth SRS transmission occasion in a fourth FH period of the four FH periods is to be transmitted on a fourth frequency portion of the SRS band having an index of three.

14. One or more non-transitory, computer-readable media having instructions that, when executed, one or more processors to:

receive, from a base station, control information associated with sounding reference signal (SRS) transmission, wherein the control information indicates an SRS band including a plurality of resource blocks (RBs), and the control information further indicates a subband for a user equipment (UE) in the SRS band; and
determine a first starting location within the subband for the SRS transmission in a first SRS transmission occasion and a second starting location within the subband for the SRS transmission in a second SRS transmission occasion based on a location hopping parameter, wherein the location hopping parameter is determined based on a step parameter and a transmission occasion index and the transmission index is a first index associated with SRS transmission occasions that have the subband at a first frequency location or a second index associated with SRS transmission occasions that have the subband at a second frequency location; and
generate, for transmission to the base station, the SRS transmission in the first and second SRS transmission occasions according to the control information.

15. The one or more non-transitory, computer-readable media of claim 14, wherein the SRS transmission is a triggered aperiodic (AP)-SRS, and the transmission index is counted from a first transmission occasion of the triggered AP-SRS.

16. The one or more non-transitory, computer-readable media of claim 14, wherein the first SRS transmission occasion and the second SRS transmission occasion are configured within a same slot and the location hopping parameter indicates that different frequency ranges are allocated for the first SRS transmission occasion and the second SRS transmission occasion.

* * * * *